US011292737B2

(12) United States Patent
Qin et al.

(10) Patent No.: US 11,292,737 B2
(45) Date of Patent: Apr. 5, 2022

(54) APPARATUS FOR PRODUCING DRINKABLE WATER FROM AIR

(71) Applicant: Guangxi Nanning Yiyunlu Environmental Protection Technology Co., Ltd., Guangxi (CN)

(72) Inventors: Geng Qin, Guangxi (CN); Hai Li, Zhejiang (CN); Chuan Luo, Guangxi (CN)

(73) Assignee: GUANGXI NANNING YIYUNLU ENVIRONMENTAL PROTECTION TECHNOLOGY CO., LTD., Nanning (CN)

(*) Notice: Subject to any disclaimer, the term of this patent is extended or adjusted under 35 U.S.C. 154(b) by 697 days.

(21) Appl. No.: 16/316,039

(22) PCT Filed: Aug. 6, 2018

(86) PCT No.: PCT/CN2018/098922
§ 371 (c)(1),
(2) Date: Jan. 8, 2019

(87) PCT Pub. No.: WO2019/091161
PCT Pub. Date: May 16, 2019

(65) Prior Publication Data
US 2021/0347663 A1     Nov. 11, 2021

(30) Foreign Application Priority Data
Nov. 13, 2017   (CN) .......................... 201711163172.0

(51) Int. Cl.
C02F 9/00          (2006.01)
C02F 1/32          (2006.01)
(Continued)

(52) U.S. Cl.
CPC .............. *C02F 9/005* (2013.01); *C02F 1/325* (2013.01); *C02F 1/444* (2013.01);
(Continued)

(58) Field of Classification Search
CPC .... C02F 9/005; C02F 9/08; C02F 9/00; C02F 1/325; C02F 1/444; C02F 1/00;
(Continued)

(56) References Cited

FOREIGN PATENT DOCUMENTS

| CN | 1989305 | 6/2007 |
|---|---|---|
| CN | 201232219 | 5/2009 |

(Continued)

OTHER PUBLICATIONS

CN 101967843 A English description, Feb. 2011, Dongda Qian et al.*
(Continued)

*Primary Examiner* — Akash K Varma
(74) *Attorney, Agent, or Firm* — Bayramoglu Law Offices LLC (57) ABSTRACT

The present invention relates to the field of water condensing apparatus, and particularly to an apparatus for producing drinkable water from air, comprising: a condensing device for condensing moisture out of air, a purification device, and a horizontally disposed tri-layer platform; the condensing device comprises an adsorption rotor, a heat exchange mechanism, and an air circulation duct group; the purification device comprises a water storage component and a purification component, and the purification component comprises a filter member and an ultraviolet sterilization member in communication with the heat exchange mechanism. As such, the moisture in the air is first condensed out; and then sterilization and filtration are performed, so as to avoid redundant work of the apparatus and improve the operating efficiency. The air entering from the air inlet of the
(Continued)

heat exchanger firstly undergoes the heat exchange to condense water in the heat exchanger, and then enters the adsorption rotor from the first air outlet of the heat exchanger to perform secondary condensation on the condensed air, thereby further improving the condensation efficiency.

6 Claims, 7 Drawing Sheets

(51) Int. Cl.
    *C02F 1/44*     (2006.01)
    *E03B 3/28*     (2006.01)

(52) U.S. Cl.
    CPC ...... *C02F 2301/04* (2013.01); *C02F 2303/04* (2013.01); *E03B 3/28* (2013.01)

(58) Field of Classification Search
    CPC .. C02F 1/04; C02F 1/001; C02F 1/283; C02F 1/32; C02F 1/44; C02F 2301/04; C02F 2303/04; C02F 2103/08; B01D 5/00; B01D 5/0009; B01D 5/0048; B01D 5/0051; B01D 5/0081; B01D 5/0084; E03B 3/28; F28B 1/02; Y02A 20/109; Y02A 20/154; Y02A 20/128; Y02A 20/00; Y02A 20/152; Y02W 10/37

USPC .......................................................... 210/294
See application file for complete search history.

(56) References Cited

FOREIGN PATENT DOCUMENTS

| CN | 201232219 Y | * | 5/2009 | ............... E03B 3/28 |
|---|---|---|---|---|
| CN | 201232219 Y | * | 5/2009 | ............... E03B 3/28 |
| CN | 201605624 | | 10/2010 | |
| CN | 101967843 | | 2/2011 | |
| CN | 101967843 A | * | 2/2011 | ............... C02F 9/08 |
| CN | 107816084 | | 3/2018 | |
| CN | 107816084 A | * | 3/2018 | ............... E03B 3/28 |
| WO | 2005075046 | | 8/2005 | |
| WO | 2016187709 | | 12/2016 | |

OTHER PUBLICATIONS

CN 201232219 Y English description, May 2009, Fuping Ji et al.*
CN 107816084 A English description, Mar. 2018, Ge Runsheng et al.*
"International Search Report (Form PCT/ISA/210)", dated Oct. 18, 2018, pp. 1-5.

* cited by examiner

APPARATUS FOR PRODUCING DRINKABLE WATER FROM AIR

TECHNICAL FIELD

The present invention relates to the field of water condensing apparatus, and particularly to an apparatus for producing drinkable water from air.

DESCRIPTION OF RELATED ART

All over the earth on which humans depend for living, many countries and regions are reduced to water shortage due to environmental and climate issues, people there are severely deprived of normal and healthy access to drinkable water. The art to produce water from air takes effective use of moisture in the air of the earth, with prior arts in the market generally adopting compressor refrigeration (i.e. to condense out of air) to extract the moisture from air; however, the apparatus for producing drinkable water from air is prone to frosting on its vaporizer when operating under a low temperature/slightly humid environment. In addition, it's inevitable to adopt refrigerant if a compressor is employed, with atmospheric ozonosphere destroyed by the refrigerant, causing environmental pollution.

In order to address the above problem, a patent disclosure No. CN201010294394.8 discloses an apparatus for producing drinkable water from air, comprising: a housing, a frame, a water producing component, a water processing component and a controller; the water producing component, the water processing component and the controller are all disposed within the housing; the water producing component comprises a absorption rotor, a heat rejection fan, a regeneration heater, a heat exchanger and an inlet air blower, wherein the hear rejection fan is connected with the regeneration heater and they are both fixed onto the frame; the heat exchanger comprises an outer cavity and an inner cavity; the regeneration heater forms a absorption rotor regeneration zone on the absorption rotor; the absorption rotor, the outer cavity of the heat exchanger and the inlet air blower form an inlet air passage; the heat rejection fan, the regeneration heater, the absorption rotor regeneration zone and the inner cavity of the heat exchanger form a humid air passage; and the absorption rotor regeneration zone is connected with the heat exchanger through a regeneration ventilation duct.

Operating principles behind the above technical solution are as follows: an air filter is provided in front of the absorption rotor and is fixed on the housing, effective in absorbing bacteria, oil, harmful gases and fine particles in the air; the water producing component further comprises a water collection drawer, and the heat exchanger is connected with the water collection drawer through a conduit for collecting the water produced by the water producing component; a lower water tank is used to store water before purification and sterilization, and a upper water tank is used to store the water after purification and sterilization; and the purification and sterilization devises are both used to process the water produced by the water producing component.

Defects of the above solution are as follows: during the process that the air filter in front of the absorption rotor absorbs the bacteria, oil, harmful gases and fine particles in the air, a certain amount of moisture is also absorbed, with moisture in the air reduced. As a result, operating period is extended in terms of equal amount of water obtained, which causes electrical consumption and unnecessary waste of energy.

SUMMARY

It is an object of the present invention to provide an apparatus for producing drinkable water from air, so as to overcome the defects of the prior art.

The following technical solution is set forth to address the above problems:

An apparatus for producing drinkable water from air, comprising: a condensing device, a purification device for purifying the condensed water from the condensing device, and a tri-layer platform disposed horizontally; the condensing device is provided on the upper half section of the tri-layer platform and the purification device is provided on the lower half section; the condensing device comprises a absorption rotor for blocking moisture in the air, a heat exchange mechanism and a circulation duct group for ensuring air circulation between the absorption rotor and the heat exchange mechanism; the purification device comprises a water storage component and a purification component, and the purification component comprises a filter member and an ultraviolet sterilization member in communication to the heat exchange mechanism.

Further, the absorption rotor, as a cylinder and featuring a cellular structure, is disposed vertically and is mounted on the top end of the bi-layer platform by clamp plates; the vertical clamp plates are provided with ring grooves for amounting the absorption rotor, the axis of the absorption rotor is perpendicular to the planes of the clamp plates; the absorption rotor is sleeved with a belt around its cylinder periphery; a drive motor is provided on a side of the clamp plates, and drive the absorption rotor to rotate around its axis; and circular through holes on the clamp plates are provided on both sides of the absorption rotor for allowing air passage.

Further, the heat exchange mechanism comprises a heat exchanger having an air inlet, a hot air inlet, a first air outlet, a second air outlet and a water outlet, the circulation duct group comprises a first connection duct for communicating the hot air inlet of the heat exchanger to the absorption rotor on its one side near the heat exchanger, a second connection duct right above the first connection duct for communicating the first air outlet of the heat exchanger to the absorption rotor on its one side near the heat exchanger, and a third connection duct for communicating the second air outlet to the absorption rotor on its one side away from the first connection duct, wherein the air inlet of the heat exchanger is connected with a fan, and the water outlet of the heat exchanger is connected with the ultraviolet sterilization member.

Further, a heater is provided on the side where the absorption rotor is in communication to the third connection duct, a sectorial connection plate is provided at the position where the absorption rotor is connected with the first connection duct, the heater is opposite to the sectorial connection plate, and the pointed end of the sectorial connection plate points vertically upward and towards the center of a corresponding through hole.

Further, the ultraviolet sterilization member comprises an ultraviolet germicidal lamp and a horizontally disposed water storage pot, the water storage pot is provided with a water inlet duct communicating with the water outlet of the heat exchanger and a water outlet duct communicating with the filter member, the water inlet duct and the outlet duct are both vertically disposed at the top of the water storage pot, and the filter member comprises a plurality of ultrafiltration membranes connected end to end.

Further, the water storage component comprises a water collection tank disposed right below the filter member and a water storage tank disposed at the top of the tri-layer platform, and the water collection tank and the water storage tank are provided with a pump therebetween to convey water in the water collection tank to the water storage tank.

Further, the fan and the water storage tank are disposed on the upper layer of the tri-layer platform, the absorption rotor and the ultraviolet sterilization component are disposed in the middle layer of the tri-layer platform, and the water collection tank and the pump are disposed on the lower layer of the tri-layer platform, and the heat exchanger is disposed between the upper and middle layers of the tri-layer platform, the filter member is disposed between the middle and lower layers of the tri-layer platform.

Further, the water storage tank is in communication to the pump through a water duct.

The present technical solution has the following advantages: disclosed is an apparatus for producing drinkable water from air, the fan is started to blow air from the air inlet of the heat exchanger into the heat exchanger, air from the second outlet of the heat exchanger passes through the heater and the absorption rotor through the third connection duct; the drive motor drives the absorption rotor to rotate, the air from the first outlet of the heat exchanger enters the absorption rotor through the second connection duct, the absorption rotor retains moisture in the air, the moisture-deprived air passes through the absorption rotor; the heated air from the third connection duct passes through the absorption rotor and gets mixed into the humid air in the absorption rotor, the humid air enters the heat exchanger from the hot air inlet and exchanges heat with the air entering from the air inlet to condense moisture into water; after the water enters the water storage pot from the water outlet of the heat exchanger and undergoes ultraviolet sterilization, it enters the filter member to undergo a filtration that enables it to meet the drinkable water standard, and then enters the water collection tank; the pump conveys the water in the water collection tank through the water duct into the water storage tank, so that the moisture in the air is first condensed out; and then sterilization and filtration are carried out, so as to avoid redundant work of the apparatus and improve the operating efficiency. The air entering from the air inlet of the heat exchanger firstly undergoes the heat exchange to condense water in the heat exchanger, and then enters the absorption rotor from the first air outlet of the heat exchanger to perform secondary condensation on the condensed air, thereby further improving the condensation efficiency.

To make the aforementioned more comprehensible, several embodiments accompanied with drawings are described in detail as follows.

References: condensing device 1, absorption rotor 1a, vertical clamp plate 1a1, ring groove 1a2, drive motor 1a3, belt 1a4, circular through hole 1a5, sectorial connection plate 1a6, heat exchanger 1b, air inlet 1b1, hot air inlet 1b2, first air outlet 1b3, second air outlet 1b4, water outlet 1b5, circulation duct group 1c, first connection duct 1c1, second connection duct 1c2, third connection duct 1c3, water purification device 2, water storage component 2a, water collection tank 2a1, water storage tank 2a2, pump 2a3, water duct 2a4, purification component 2b, filter member 2b1, ultraviolet sterilization member 2b2, water storage pot 2b3, water inlet duct 2b4, water outlet duct 2b5, ultraviolet germicidal lamp 2b6, fan 3, heater 4, tri-layer platform 5.

DESCRIPTION OF THE EMBODIMENTS

The embodiments of the present invention are further described in detail below with reference to the accompanying drawings and embodiments.

Referring to FIG. 1 to FIG. 8, an apparatus for producing drinkable water from air comprises a condensing device for condensing water out of the air, and a purification device for purifying the condensed water from the condensing device 1, and a horizontally disposed tri-layer platform 5; the condensing device 1 is disposed on the upper half section of the tri-layer platform 5, and the purification device 2 is disposed on the lower half section of the tri-layer platform 5; the condensing device 1 comprises an absorption rotor 1a for blocking moisture in the air, a heat exchange mechanism, and a circulation duct group 1c for realizing air circulation between the absorption rotor 1a and the heat exchange mechanism; the purification device 2 comprises a water storage component 2a and a purification component 2b, the purification component 2b comprises a filter member 2b1 and an ultraviolet sterilization member 2b2 in communication to the heat exchange mechanism. The heat exchange mechanism and the absorption rotor 1a cooperate to condense moisture in the air into water, and the water enters firstly into the ultraviolet sterilization component 2b2; and after sterilization, the water enters the filter component 2b1 to undergo filtration, and after the filtration is completed, the water enters the water storage component 2a.

Figure 7:
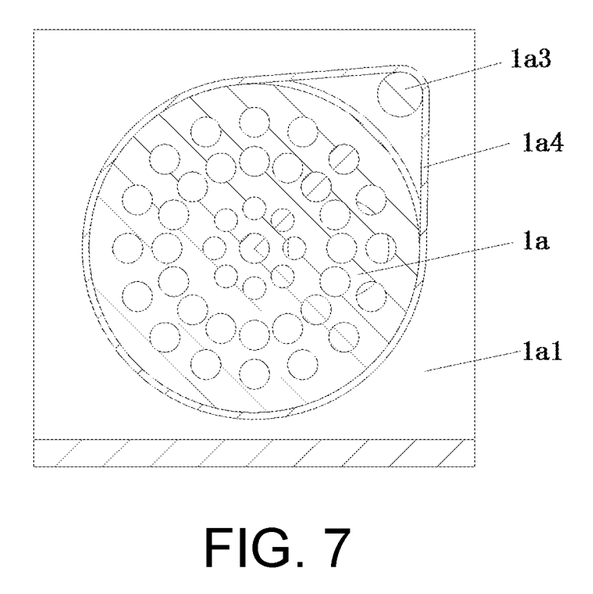
FIG. 7 is a longitudinal sectional view of the absorption rotor of the present invention.
Figure 8:
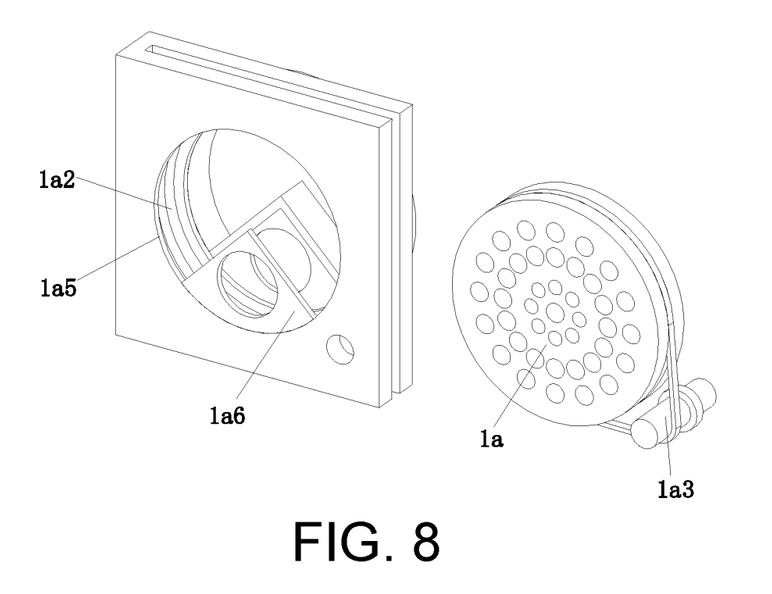
FIG. 8 is a schematic exploded view showing the structure of the absorption rotor of the present invention.

The absorption rotor 1a is vertically disposed, and the absorption rotor 1a is mounted at the top end of the bi-layer platform by means of vertical clamp plates 1a1, the absorption rotor 1a is cylindrical and has a cellular structure, and the vertical clamp plates 1a1 are provided with ring grooves 1a2 for mounting the absorption rotor, the axis of the absorption rotor 1a is perpendicular to planes of the vertical plates 1a1, the absorption rotor 1a is sleeved with a belt 1a4 around its periphery, and a drive motor 1a3 is provided on a side of the vertical plates 1a1. The drive motor 1a3 drives the absorption rotor 1a to rotate around its own axis by means of the belt 1a4, and the vertical clamp plates 1a1 are provided with circular through holes for air passage on both sides of the absorption rotor 1a, and the absorption rotor 1a is provided with a high-efficiency water absorbing material therein, the motor is started to drive the absorption rotor 1a to rotate slowly, and the air from a second connection duct 1c2 enters the absorption rotor 1a from the upper half section of the absorption rotor 1a, and the absorption rotor 1a blocks the moisture in the air. The absorption rotor 1a can increase the humidity of the air passing through the absorption rotor 1a by more than 5 times.

Figure 3:
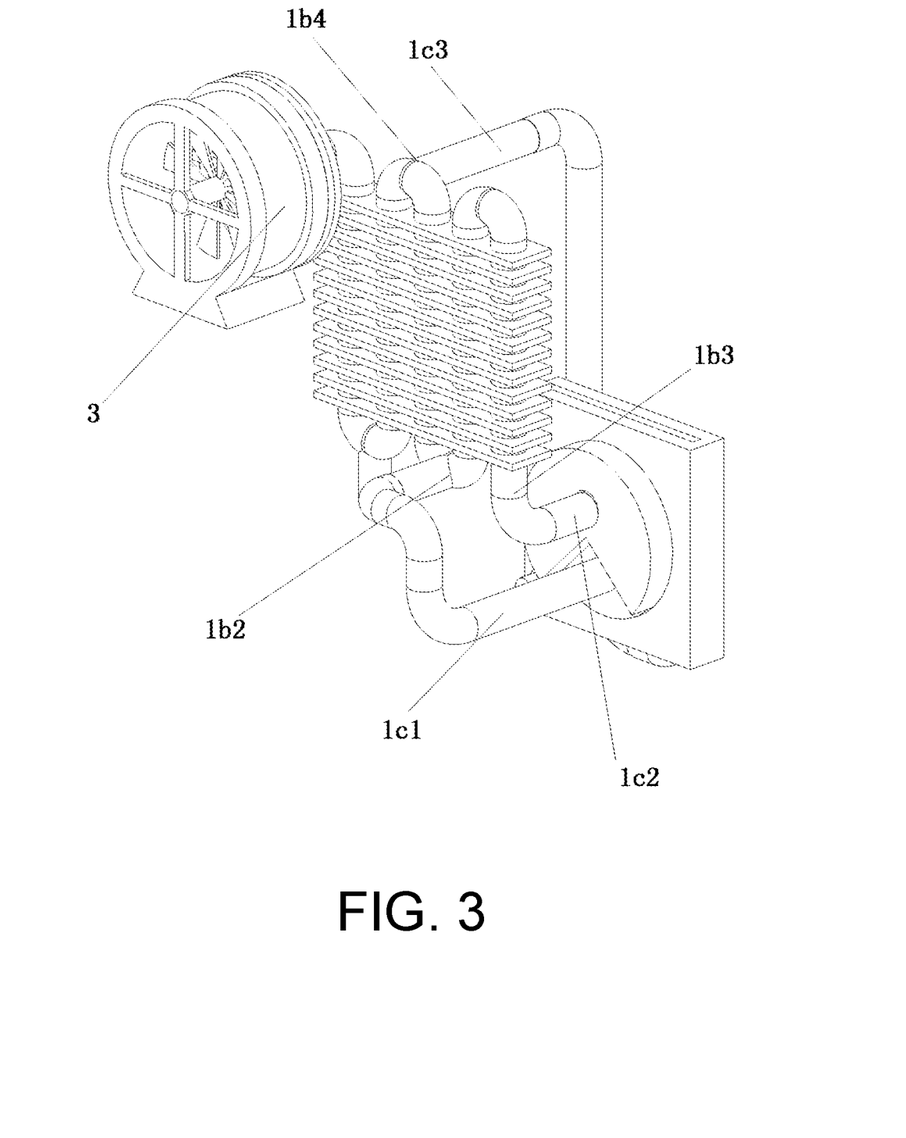
FIG. 3 is a first perspective view showing the structure of the condensing device of the present invention.
Figure 4:
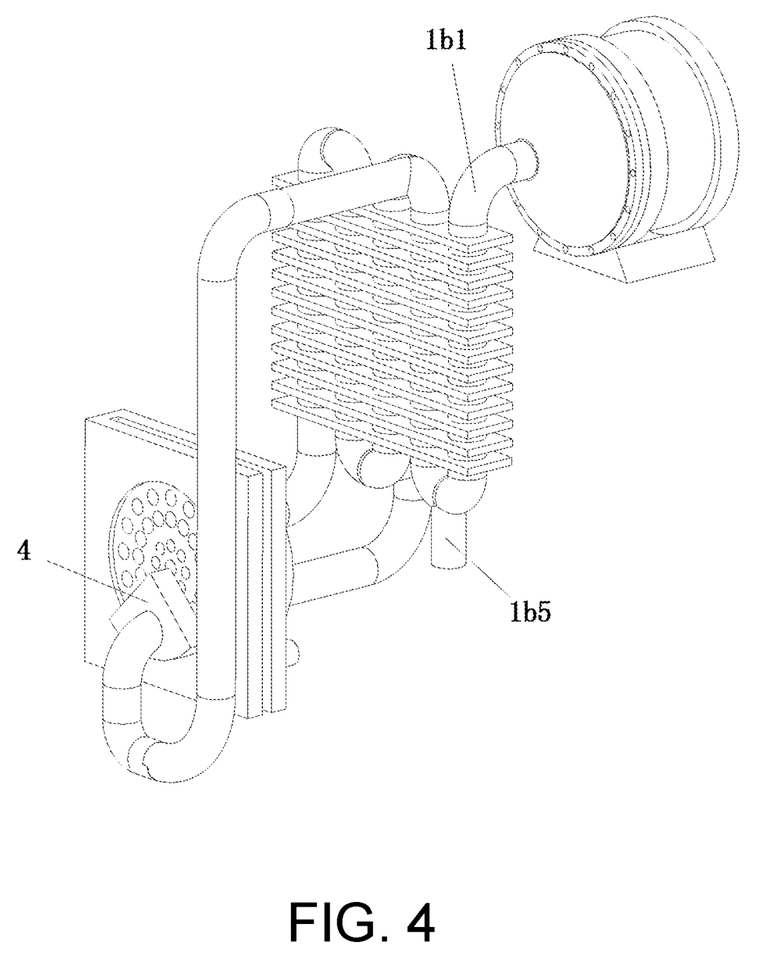
FIG. 4 is a second perspective view showing the structure of the condensing device of the present invention.

The heat exchange mechanism comprises a heat exchanger 1b, an air inlet 1b1, a hot air inlet 1b2, a first air outlet 1b3, a second air outlet 1b4, and a water outlet 1b5 of the heat exchanger 1b. The circulation duct group comprises a first connection duct 1c1 for communicating the hot air inlet 1b2 of the heat exchanger 1b to the absorption rotor 1a on its one side near the heat exchanger 1b, a second connection duct 1c2 right above the first connection duct for communicating the first air outlet 1b3 of the heat exchanger 1b to the absorption rotor 1a on its one side near the heat exchanger 1b, and a third connection duct 1c3 for communicating the second air outlet 1b4 to the absorption rotor 1a on its one side away from the first connection duct 1c1, the air inlet 1b1 of the heat exchanger 1b is connected to the fan 3, the water outlet of the heat exchanger 1b is connected to the ultraviolet sterilization member 2b2; and the fan 3 is started to blow the air from the air inlet 1b1 of the heat exchanger 1b into the heat exchanger 1b. And the air from the second air outlet 1b4 of the heat exchanger 1b passes through the heater 4 and the absorption rotor 1a through the third connection duct 1c3, and the drive motor 1a3 drives the absorption rotor 1a to rotate. The air from the first air outlet 1b3 of the exchanger 1b enters the absorption rotor 1a through the second the connection duct 1c2, the absorption rotor 1a retains moisture in the air, the moisture-deprived air passes through the absorption rotor 1a, and the heated air from the third connection duct 1c3 passes through the absorption rotor 1a and gets mixed into the humid air in the absorption rotor 1a, and the humid air enters the heat exchanger 1b from the hot air inlet 1b2 to exchange heat with the air entering from the air inlet thereof, so as to condense moisture out.

The heater 4 is provided on the side where the absorption rotor 1a is in communication to the third connection duct 1c3, a sectorial connection plate 1a6 is provided at the position where the absorption rotor 1a is connected with the first connection duct 1c1, the heater 4 is opposite to the sectorial connection plate 1a6, and the pointed end of the sectorial connection plate 1a6 points vertically upward and towards the center of a corresponding through hole. And the air from the second air outlet b4 of the heat exchanger 1b is heated by the heater 4 into hot air when passing through the third connection duct 1c3, gets mixed with the humid air in the absorption rotor 1a, passes through the absorption rotor 1a, and enters into the heat exchanger 1b through the first connection duct 1c1.

Figure 5:
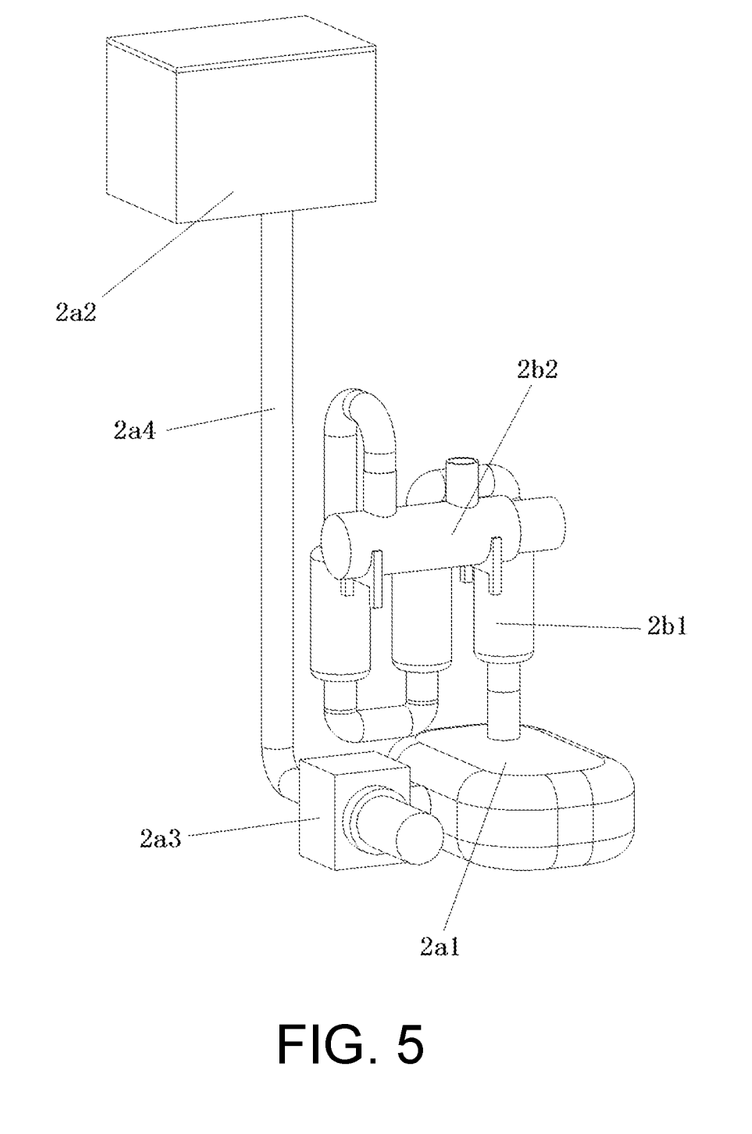
FIG. 5 is a first perspective view showing the structure of the water purification device of the present invention.
Figure 6:
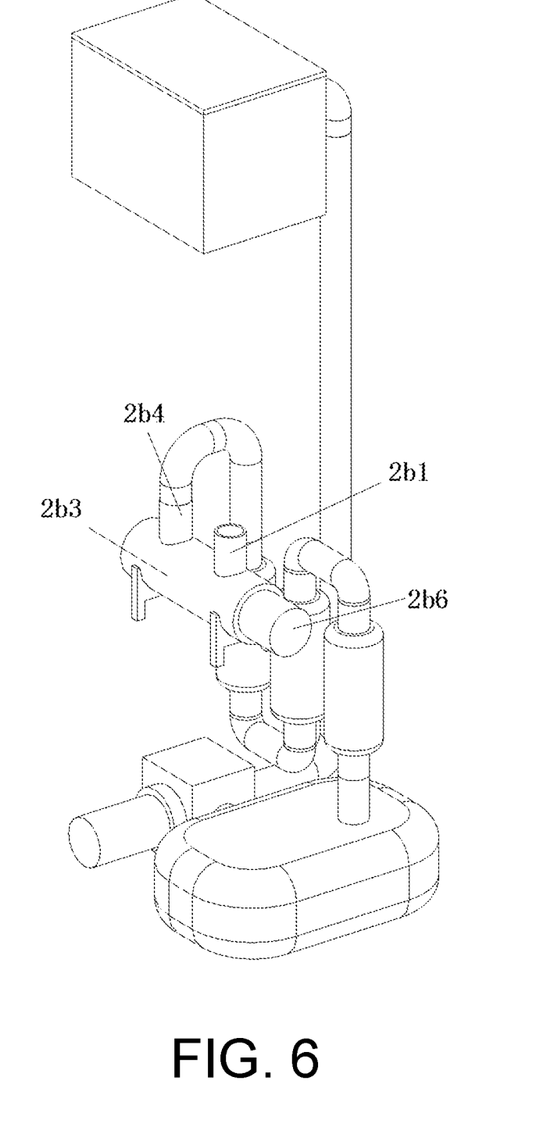
FIG. 6 is a second perspective view showing the structure of the water purification device of the present invention.

The ultraviolet sterilization member 2b2 comprises an ultraviolet germicidal lamp 2b6 and a horizontally disposed water storage pot 2b3 provided with a water inlet duct 2b4 communicating with the water outlet 1b5 of the heat exchanger 1b and a water outlet duct 2b5 communicating with the filter member 2b1. The water inlet duct 2b4 and the outlet duct 2b5 are vertically disposed at the top of the water storage pot 2b3, and the filter member 2b1 comprises a plurality of ultrafiltration membranes connected end to end, and the water enters the water storage pot 2b3 from the water inlet duct 2b4. After being sterilized by the ultraviolet lamp, the water is introduced into the filter member 2b1 from the water outlet duct 2b5.

The water storage component 2a comprises a water collection tank 2a1 disposed directly below the filter member 2b1 and a water storage tank 2a2 disposed at the top of the tri-layer platform 5. The water collection tank 2a1 and the water storage tank 2a2 are provided therebetween with a pump 2a3 to convey the water from the water collection tank 2a1 to the water storage tank 2a2. The water undergoes filtration in the filter member 2b1 and then enters the water collection tank 2a1, and the pump 2a3 conveys the water in the water collection tank 2a1 into the water storage tank 2a2.

Figure 1:
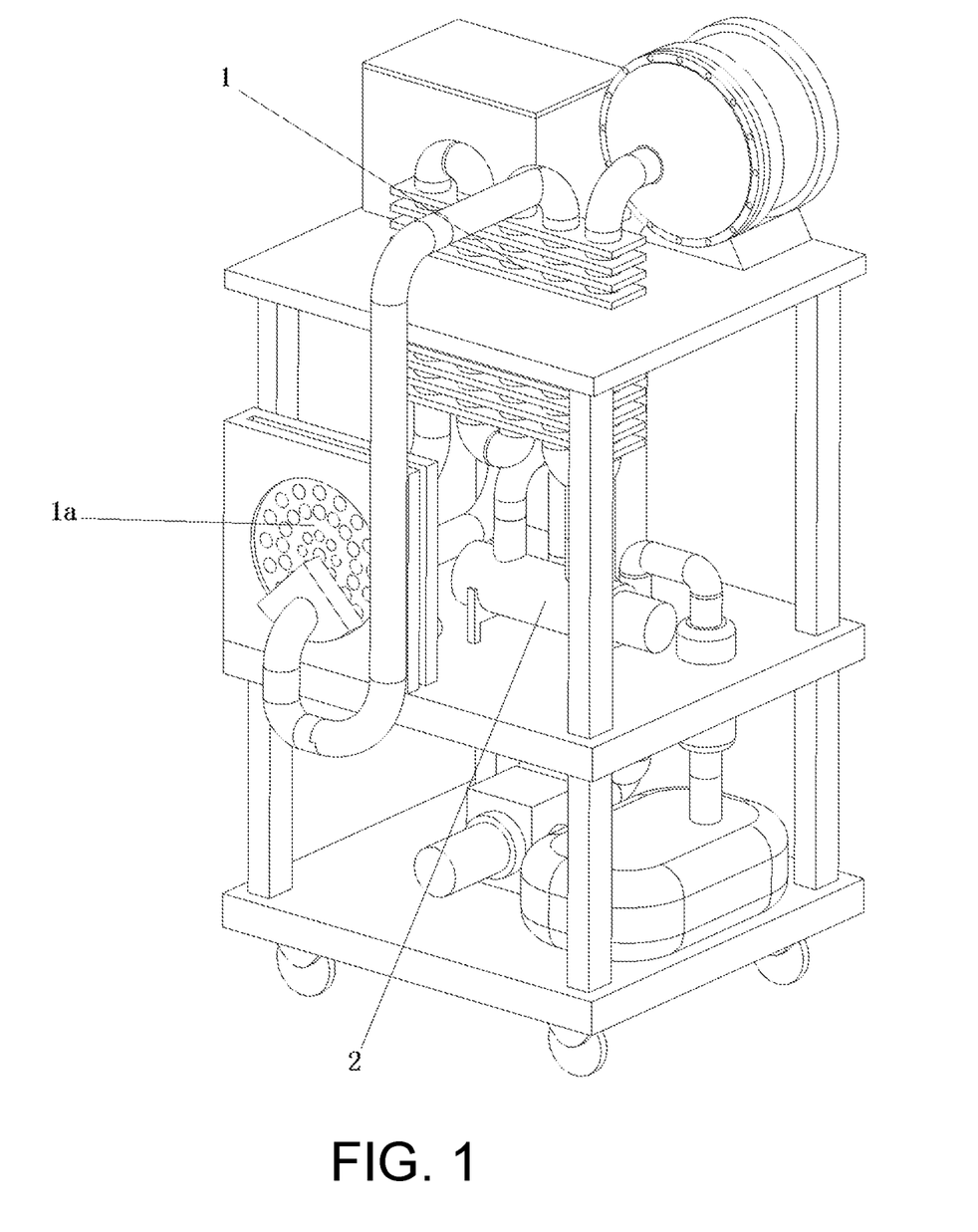
FIG. 1 is a first schematic perspective view of the present invention.
Figure 2:
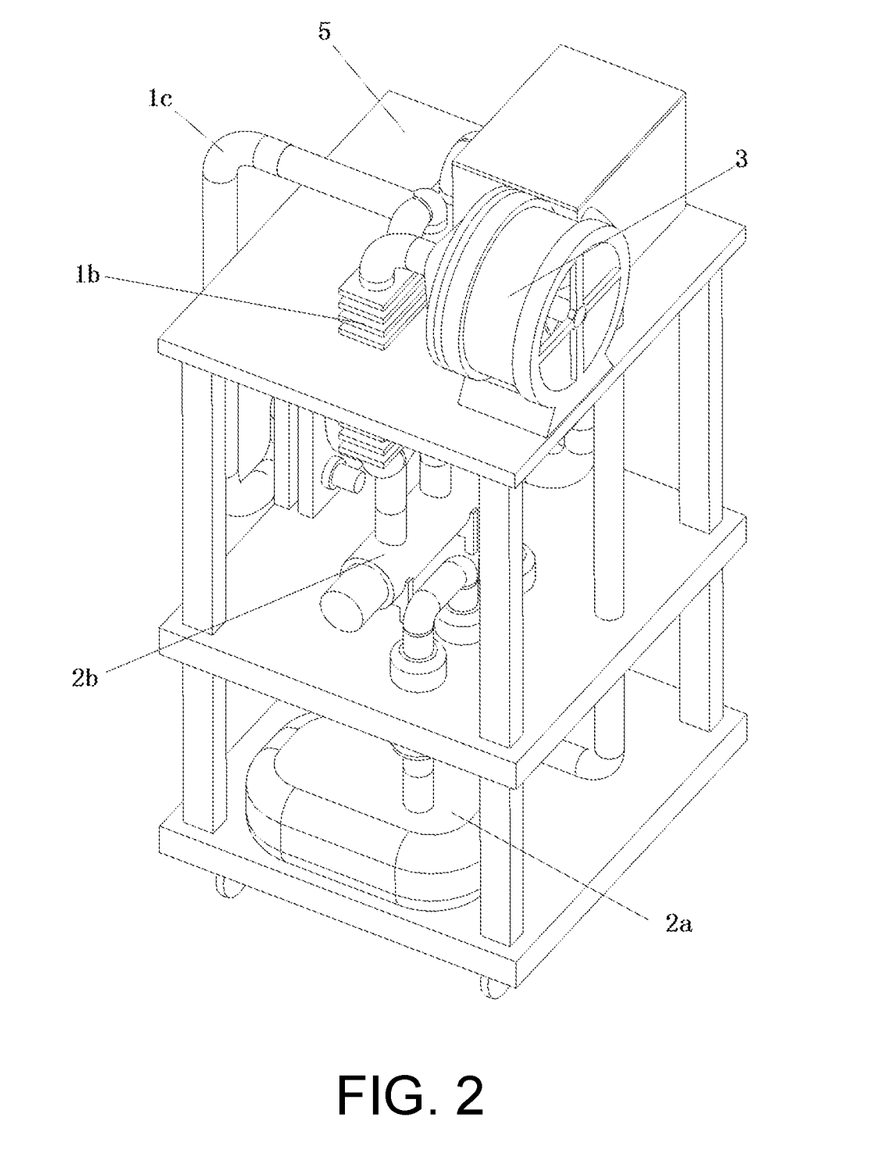
FIG. 2 is a second schematic perspective view of the present invention.

The fan 3 and the water storage tank 2a2 are both disposed on the upper layer of the tri-layer platform 5, and the absorption rotor 1a and the ultraviolet sterilization member 2b2 are disposed on the middle layer of the tri-layer platform 5, and the water collection tank 2a1 and the pump 2a3 are disposed on the lower layer of the tri-layer platform 5; the heat exchanger 1b is disposed between the upper layer and the middle layer of the tri-layer platform 5, and the filter member 2b1 is disposed between the middle layer and the lower layer of the tri-layer platform 5, so that the structure is relatively stable; and the water storage tank 2a2 is provided with a cold water storage tank and a hot water storage tank therein, the cold water storage tank and the hot water storage tank are all provided with a liquid level sensor, and the hot water storage tank is provided with a temperature sensor therein; the apparatus is provided with a controller, the fan 3, the drive motor 1a3, the ultraviolet germicidal lamp 2b6 and the heat exchanger 1b are all electrically connected to the controller.

The water storage tank 2a2 communicates with the pump 2a3 through the water duct 2a4, and the pump 2a3 conveys the water in the water collection tank 2a1 to the water storage tank 2a2 through the water duct 2a4.

Operating principles are as follows: the fan 3 is started to blow air from the air inlet 1b1 of the heat exchanger 1b into the heat exchanger 1b, and the air from the second outlet 1b4 of the heat exchanger 1b passes through the heater 4 and the absorption rotor 1a through the third connection duct 1c3; the drive motor 1a3 drives the absorption rotor 1a to rotate, the air from the first outlet 1b3 of the heat exchanger 1b passes through the second connection duct 1c2 into the absorption rotor 1a, and the absorption rotor 1a retains moisture in the air; the moisture-deprived air passes through the absorption rotor 1a, and the heated air from the third connection duct 1c3 passes through the absorption rotor 1a and gets mixed into the humid air in the absorption rotor 1a, and the humid air enters the heat exchanger 1b from the hot air inlet 1b2 and exchanges heat with the air entering from the air inlet thereof to condense moisture into water. The water enters the water storage pot 2b3 from the water outlet 1b5 of the heat exchanger 1b and is sterilized by ultraviolet rays, and then enters the filter member 2b1 to undergo filtration so as to reach the standard of drinkable water; and then the water enters the water collection tank 2a1, and the pump 2a3 conveys the water in the water collection tank 2a1 into the water storage tank 2a2 through the water duct 2a4.

The above are only preferred embodiments of the present invention, but not intended to limit the technical scope of the present invention. Therefore, any minor modifications, equivalent changes, and modifications made to the above embodiments in accordance with the technical spirit of the present invention still fall within the scope of the technical solution of the present invention.

What is claimed is:

1. An apparatus for producing drinkable water from air, characterized by comprising: a condensing device, a purification device for purifying a condensed water from the condensing device, and a tri-layer platform disposed horizontally; the condensing device being provided on an upper half section of the tri-layer platform and the purification device being provided on a lower half section of the tri-layer platform; the condensing device comprising an absorption rotor for blocking moisture in the air, a heat exchange mechanism and a circulation duct group for ensuring air circulation between the absorption rotor and the heat exchange mechanism; the purification device comprising a water storage component and a purification component, and the purification component comprising a filter member and an ultraviolet sterilization member both in communication to the heat exchange mechanism;

wherein the absorption rotor is vertically disposed and is mounted at a top end of the tri-layer platform by vertical clamp plates, the absorption rotor is cylindrical and has a honeycomb structure, and the vertical clamp plates are provided with ring grooves for mounting the absorption rotor, an axis of the absorption rotor is perpendicular to planes of the vertical clamp plates, the absorption rotor is sleeved with a belt, and a drive motor is provided on a side of the vertical clamp plates; the drive motor drives the absorption rotor to rotate around the axis by the belt, and the vertical clamp plates are provided with circular through holes for air passage on a one side of the absorption rotor and on a second side of the absorption rotor;

wherein the heat exchange mechanism comprises a heat exchanger, an air inlet, a hot air inlet, a first air outlet, a second air outlet, and a water outlet of the heat exchanger; the circulation duct group comprises a first connection duct for communicating the hot air inlet of the heat exchanger to the absorption rotor on the one side of the absorption rotor near the heat exchanger, a second connection duct right above the first connection duct for communicating the first air outlet of the heat exchanger to the absorption rotor on the one side of the absorption rotor near the heat exchanger, and a third connection duct for communicating the second air outlet of the heat exchanger to the absorption rotor on the one side of the absorption rotor away from the first connection duct, the air inlet of the heat exchanger is connected to a fan, the water outlet of the heat exchanger is connected to the ultraviolet sterilization member.

2. The apparatus for producing drinkable water from air according to claim 1, characterized in that: a heater is provided on the second side of the absorption rotor where the absorption rotor is in communication to the third connection duct, a sectorial connection plate is provided at a position where the absorption rotor is connected with the first connection duct, the heater is opposite to the sectorial connection plate, and a pointed end of the sectorial connection plate points vertically upward and towards a center of a corresponding circular through hole of the circular through holes.

3. The apparatus for producing drinkable water from air according to claim 2, characterized in that: the ultraviolet sterilization member comprises an ultraviolet germicidal lamp and a horizontally disposed water storage pot provided with a water inlet duct communicating with the water outlet of the heat exchanger and a water outlet duct communicating with the filter member; the water inlet duct and the water outlet duct are both vertically disposed at a top of the water storage pot, and the filter member comprises a plurality of ultrafiltration membranes connected end to end.

4. The apparatus for producing drinkable water from air according to claim 3, characterized in that: the water storage component comprises a water collection tank disposed directly below the filter member and a water storage tank disposed at a top of the tri-layer platform; the water collection tank and the water storage tank are both provided therebetween with a pump to convey water from the water collection tank to the water storage tank.

5. The apparatus for producing drinkable water from air according to claim 4, characterized in that: the fan and the water storage tank are both disposed on an upper layer of the tri-layer platform, and the absorption rotor and the ultraviolet sterilization member are both disposed on a middle layer of the tri-layer platform, and the water collection tank and the pump are both disposed on a lower layer of the tri-layer platform; the heat exchanger is disposed between the upper layer and the middle layer of the tri-layer platform, and the filter member is disposed between the middle layer and the lower layer of the tri-layer platform.

6. The apparatus for producing drinkable water from air according to claim 5, characterized in that: the water storage tank is in communication to the pump through a water duct.

\* \* \* \* \*